Patented Oct. 16, 1951

2,571,755

UNITED STATES PATENT OFFICE 2,571,755

PREPARATION OF THREONINE AND INTERMEDIATES THEREFOR

Karl Pfister, III, Westfield, N. J., Charles A. Robinson, Cambridge, Mass., and Max Tishler, Westfield, N. J., assignors to Merck & Co., Inc., Rahway, N. J., a corporation of New Jersey No Drawing. Application December 9, 1948, Serial No. 64,424

21 Claims. (Cl. 260—294)

This invention relates to the preparation of amino acids from readily available starting materials. More particularly, it is concerned with a new and improved process for manufacturing DL-threonine, an essential amino acid required for growth, from α-halo-β-alkoxy-n-butyric acids. It is also concerned with the preparation of certain novel chemical compounds, produced as intermediates in the synthesis of DL-threonine. These intermediate compounds include the amides, mono or disubstituted amides, and secondary heterocyclic amine derivatives of dl-α-halo-β-alkoxy-n-butyric acids.

Methods now available for the preparation of the essential amino acid DL-threonine are generally unsatisfactory in that the yield is predominately DL-allothreonine and not DL-threonine. Thus, the method of Carter and West, as published in Organic Syntheses, vol. 20, page 101 (1940), involves aminating a racemic mixture of α-bromo-β-methoxy-butyric acids which is approximately 40% precursor of DL-threonine and 60% precursor of DL-allothreonine. Since allothreonine is of no value, the separation of DL-threonine must be carried out. This separation is difficult and costly. The DL-threonine is isolated in the pure state in about 17.5% yield by formylation and fractional crystallization.

Similarly, the method of West et al. as disclosed in Jour. Biol. Chem., vol. 122, page 605 (1938) involves utilizing one of the diastereoisomer forms of α-bromo-β-methoxy-n-butyric acid, having a melting point of about 62–63° C., as the starting material. While this racemic form is readily prepared, unfortunately upon amination and hydrolysis it resulted in high yields of DL-allothreonine and only traces of DL-threonine.

The other diastereoisomeric form of dl-α-bromo-β-methoxy-n-butyric acid, which melts at 49° C., results in DL-threonine in good yield on amination and hydrolysis but no practical method exists for its production.

It is one of the objects of our invention to provide a method for converting the high melting racemic form of dl-α-bromo-β-methoxy-n-butyric acid of West et al. and the racemic mixtures of Carter et al. to threonine which method is efficient in its operation and results in high yields of the desired DL-threonine.

The foregoing aims and objectives of this invention as well as others subsequently explained herein, will be apparent from the ensuing disclosure of certain preferred embodiments of our invention.

We have now discovered a procedure whereby the racemic modifications of α-halo-β-alkoxy-n-butyric acids which normally lead to DL-allothreonine on amination and hydrolysis can be utilized for the production of DL-threonine.

Regarded in certain of its broader aspects, the new process, according to our invention, comprises first converting the dl-α-halo-β-alkoxy-n-butyric acid to dl-α-halo-β-alkoxy-n-butyric acid halide by reaction with a halogenating agent in an organic solvent medium, reacting the latter solution with ammonia, primary amines or secondary amines, recovering the amido derivative and then aminating and hydrolyzing the amido derivative to form DL-threonine in high yield. It appears that the formation of the new amido derivatives results in a molecular rearrangement which is responsible for the production of DL-threonine rather than DL-allothreonine from the starting racemate.

In accordance with our invention a benzene solution of dl-α-halo-β-alkoxy-n-butyric acid which normally results in the formation of DL-allothreonine upon amination and hydrolysis is treated with a halogenating agent such as thionyl chloride. The reaction is carried out by heating the reactants to reflux temperature for approximately one and one-half hours. This results in formation of a benzene solution of α-halo-β-alkoxy-n-butyric acid halide.

After removal of sulfur dioxide and hydrogen halide, the benzene solution of α-halo-β-alkoxybutyric acid halide is treated with ammonia or a benzene solution of a primary or secondary amine, and a compound of the following structure is recovered.

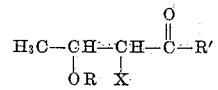

wherein R is an alkyl group, X is halogen and R' is NH₂, NH-aryl, N(alkyl)₂ or a secondary heterocyclic amine.

Among suitable amines may be mentioned piperidine, ammonia, dimethylamine and aniline.

The amido compound is treated with liquid ammonia, or a mixture of liquid ammonia and a lower aliphatic alcohol to form an α-amino-β-alkoxy-n-butyric acid amide. The solution is concentrated to dryness and the residue hydrolyzed to DL-threonine with hydrobromic acid.

We have found that amination and hydrolysis of dl-α-halo-β-alkoxy-n-butyric acid amides prepared from the acid which normally results in the formation of DL-allothreonine rather than the free acid itself, results in inversion of the racemate and recovery of the desired DL-threonine.

The following examples are presented to show how the process of the present invention can be carried out but it is understood that these examples are given primarily by way of illustration and not of limitation.

Example 1 dl-α-Bromo-β-methoxy-n-butyric acid melting point 62–63° C. was prepared as described by West, Krummel, and Carter, J. Biol. Chem., 122, 605 (1938). A sample of this acid on amination followed by hydrolysis exactly as below gave only a trace of DL-threonine (bioassay). 29.55 grams (0.15 mol) of the dl-α-bromo-β-methoxy-n-butyric acid was dissolved in 150 cc. of benzene and 2 drops of pyridine. To this reaction mixture was added 13.5 cc. of thionyl chloride and the mixture was heated at reflux temperature for 1½ hours. The hydrogen chloride and sulfur dioxide formed during the reaction were removed with 50 cc. of benzene by distillation of the mixture under reduced pressure. The residue was then diluted with an additional 100 cc. of benzene.

This benzene solution of dl-α-bromo-β-methoxy-n-butyric acid chloride was cooled in an ice bath and was added dropwise with simultaneous stirring to an ice-cooled solution of 32.5 cc. (0.33 mol) of piperidine in 100 cc. of benzene. The addition was carried out at 4–5° C. and required 1¼ hours. After removing the ice-bath, the reaction mixture was stirred for an additional half hour before filtering off the piperidine hydrochloride. The filtrate was extracted 3 times with 50 cc. of water and then concentrated under reduced pressure to constant weight 36.1 grams (91.2% of theory). The yellow oil, consisting of crude dl-α-bromo-β-methoxy-n-butyric acid piperidide crystallized solid on standing for sixteen hours at 5° C. but became sticky on warming to room temperature. Recrystallization of the crude product from a petroleum fraction of boiling point 77–115° C. resulted in a 75% yield of dl-α-bromo-β-methoxy-n-butyric acid piperidide which melted at 41–43° C. The dl-α-bromo-β-methoxy-n-butyric acid piperidide is soluble in all of the common solvents with the exception of water.

Analysis calculated for $C_{10}H_{18}O_2NBr$:
  C, 45.46; H, 6.87
Found:
  C, 45.68; H, 7.13

A solution of 13.2 grams (0.05 mol) of dl-α-bromo-β-methoxy-n-butyric acid piperidide in 60 cc. of methanol and 30 cc. of liquid ammonia was heated at 75° C. for 24 hours in a glass lined bomb. After the ammonia had evaporated from the clear red solution, it was diluted to 200 cc. with methanol and two 5 cc. samples taken for Volhard determination of bromide ion. Determination showed 98.8% reacted. The reaction mixture was concentrated to dryness under reduced pressure resulting in a residue containing dl-α-amino-β-methoxy-n-butyric acid piperidide.

To this residue was added 40 cc. of 40% hydrobromic acid and the mixture heated at reflux temperature for 15 hours. After concentrating to dryness, twice adding water, and reconcentrating to dryness, the residue was dissolved in 40 cc. of water and made alkaline to phenolphthalein with concentrated ammonium hydroxide. The piperidine was extracted with ether. The aqueous layer was made acid to Congo paper with concentrated hydrochloric acid, treated with activated charcoal and diluted to 100 cc. A 10 cc. sample was removed for bioassay. This sample, neutralized and diluted to 50 cc. with water was found to contain 7.2 mg. of DL-threonine per cc. or 63.7% DL-threonine based on α-bromo-β-methoxy-n-butyric acid piperidide used. The bioassay method used for determining the DL-threonine content is the method of J. L. Stokes and M. Gunness, published in J. Bact. 52, p. 195 (Aug. 1946).

Isolation of DL-threonine was accomplished by concentrating the remaining 90 cc. of the solution to dryness under reduced pressure. The organic material was extracted from the residual salt using three 25 cc. portions of boiling isopropanol. The isopropanol solution was cooled and a small amount of additional inorganic precipitate was removed by filtration. To the filtrate was added with stirring and scratching 7.8 cc. of aniline and the solution was shaken for sixteen hours. The white precipitate of crude DL-threonine was collected, washed with isopropanol and ether, and finally dried. Recrystallization of the crude DL-threonine from water and alcohol resulted in analytically pure DL-threonine in an overall yield of 58% based on the dl-α-bromo-β-methoxy-n-butyric acid piperidide used. This product was 100% DL-threonine by bioassay.

Analysis calculated for $C_4H_9O_3N$:
  C, 40.33; H, 7.62; N, 11.76
Found:
  C, 40.03; H, 7.70; N, 11.96

Example 2

The dl-α-bromo-β-methoxy-n-butyric acid chloride was prepared as described in Example 1 from 29.6 grams of dl-α-bromo-β-methoxy-n-butyric acid (melting point 62–63° C.). The acid chloride was dissolved in 225 cc. of benzene and cooled in an ice bath. The solution was then added dropwise with stirring to an ice-cooled solution of 27.6 cc. of aniline in 100 cc. of benzene. The addition was made at 4–5° C. and required one hour. After removing the ice-bath, the reaction mixture was stirred an additional ½ hour and then concentrated to dryness under reduced pressure. The residue was extracted with water leaving 37.7 g. (92.3% of theory) of crude dl-α-bromo-β-methoxy-n-butyranilide having a melting point of 102–5° C. Recrystallization of this crude product from a petroleum fraction of boiling point 85–100° C. resulted in rosettes of needles having a melting point of 106–107° C. dl-α-Bromo-β-methoxy-n-butyranilide is readily soluble in methanol, ethanol, and ethyl acetate, moderately soluble in benzene and in hot xylene or petroleum ether; very slightly soluble in water.

Analysis calculated for $C_{11}H_{14}O_2NBr$:
  C, 48.54; H, 5.18
Found:
  C, 48.25; H, 5.19

A solution of 13.6 grams (0.05 mole) of dl-α-bromo-β-methoxy-n-butyranilide in 60 cc. of methanol and 30 cc. of liquid ammonia was heated at 100° C. for 24 hours in a bomb. Volhard determination showed 100% reacted. The solution was concentrated to dryness in vacuo resulting in a residue containing dl-α-amino-β-methoxy-n-butyranilide.

To this residue was added 42.5 cc. of 40% hydrobromic acid and the reaction mixture heated at reflux temperature for 14 hours. The reaction mixture was concentrated to dryness in vacuo. The residue was twice dissolved in water and reconcentrated to dryness. The residue was dissolved in water and aniline removed by the same procedure as piperidine was removed in Example 1. The bioassay of the hydrolysis product for DL-threonine showed 55.0% of theory.

Isolation of DL-threonine was accomplished in the same manner as described in Example 1. The isolated crude weighed 3.25 grams (63.8% of theory), and was shown by bioassay to be 68% DL-threonine (43.5% of theory). The yield of recrystallized product was 55.2% of theory and bioassay showed the mixture to be 72% DL-threonine (39.8% of theory) and the remainder DL-allothreonine.

Analysis calculated for $C_4H_9O_3N$:
  C, 40.33; H, 7.62
Found:
  C, 40.47; H, 7.70.

Alternatively a mixture of 6.4 grams of dl-α-bromo-β-methoxy-n-butyranilide and 13.4 cc. of liquid ammonia was heated at 50° for 39 hours in a bomb. Hydrolysis of the residue by refluxing for 2 hours with 20 cc. of 40% hydrogen bromide gave a solution which was shown by bioassay to contain DL-threonine in 24.3% yield.

Example 3

A 500 cc. benzene solution of dl-α-bromo-β-methoxy-n-butyric acid chloride was prepared as described in Example 1 from 39.4 grams of dl-α-bromo-β-methoxy-n-butyric acid (melting point 62–63° C.). This solution was cooled to 5° C. in an ice bath and dry ammonia passed into the mixture maintaining the temperature between 5–6° C. When there was no more heat of reaction (approximately 45 minutes), the ammonia inflow was stopped and the slurry was stirred for 20 minutes at 5° C. and filtered from ammonium chloride and concentrated to dryness. The crude residue of dl-α-bromo-β-methoxy-n-butyramide containing some ammonium chloride was extracted with acetone to remove ammonium chloride, and the filtrate concentrated to dryness. There was secured 37.1 grams (94.6% of theory) of crude dl-α-bromo-β-methoxy-n-butyramide having a melting point of 85–98° C. Recrystallization from benzene resulted in crystalline plates having a melting point of 106–107° C. dl-α-Bromo-β-methoxy-n-butyramide is readily soluble in ethanol, isopropanol, and acetone; moderately soluble in water and in hot ethyl acetate or benzene; and very slightly soluble in ether.

Analysis calculated for $C_5H_{10}O_2NBr$:
  C, 30.03; H, 5.14; N, 7.15;
Found:
  C, 30.48; H, 5.19; N, 7.34.

A solution of 9.8 grams of dl-α-bromo-β-methoxy-n-butyramide in 60 cc. of methanol and 30 cc. of liquid ammonia was heated at 100° C. for 24 hours in a glass lined bomb. Volhard determination showed 98% reacted. The resulting clear, pale orange solution was concentrated to dryness resulting in a residue containing dl-α-amino-β-methoxy-n-butyramide.

To this residue was added 42.5 cc. of 40% hydrogen bromide and the reaction mixture was then heated at reflux temperature for 15 hours. The hydrolyzed solution was concentrated to dryness in vacuo and the residue twice dissolved in water and reconcentrated to dryness. The residue was then dissolved in water, treated with carbon, filtered and assayed. There was found a 46.0% yield of DL-threonine based on dl-α-bromo-β-methoxy-n-butyramide used.

Isolation of DL-threonine was accomplished as described in Example 1 and resulted in a 47.2% yield of DL-threonine-allo-threonine which assayed 72% DL-threonine.

Analysis calculated for $C_4H_9O_3N$:
  C, 40.33; H, 7.62
Found:
  C, 40.03; H, 7.86

Example 4

A 275 cc. benzene solution of dl-α-bromo-β-methoxy-n-butyric acid chloride was prepared as described in Example 1 from dl-α-bromo-β-methoxy-n-butyric acid (melting point 62–63° C.). This solution was cooled in an ice bath and then added dropwise with agitation to an ice-cooled solution of 19.9 grams of dimethylamine (anhydrous) in 125 cc. of benzene. The addition was carried out at a temperature of 3–5° C. and required about 1 hour. The ice bath was removed and the reaction mixture was stirred for an additional ½ hour. The precipitated dimethylamine hydrochloride was filtered off and the filtrate was concentrated under reduced pressure to an orange oil. There was secured 41.0 grams (91.5% of theory) crude dl-N,N-dimethyl-α-bromo-β-methoxy-n-butyramide. This crude material was distilled at 6 to 7 mm. pressure and resulted in a main fraction having a boiling point of 101–4° C. and $n_D^{20} = 1.4915$.

Analysis calculated for $C_7H_{14}O_2NBr$:
  C, 37.51; H, 6.30
Found:
  C, 37.74; H, 6.32

A solution of 11.2 grams (0.05 mole) of dl-N,N-dimethyl-α-bromo-β-methoxy-n-butyramide in 60 cc. of methanol and 30 cc. of liquid ammonia was heated at 100° C. for 24 hours in a glass-lined bomb. Volhard determination showed 100% reacted. The reaction mixture was concentrated to dryness resulting in a residue containing dl-N,N-dimethyl-α-amino-β-methoxy-n-butyramide.

To this residue was added 40 cc. of 40% hydrobromic acid and the reaction mixture heated to reflux temperature for 12 hours. Dimethylamine was removed by the same method as described in Example 1 for the removal of piperidine. The solution was then subjected to bioassay and the yield of DL-threonine found to be 50.5%. The recrystallized product on bioassay showed the mixture to be 92% DL-threonine.

Analysis calculated for $C_4H_9O_3N$:
  C, 40.33; H, 7.62
Found:
  C, 40.25; H, 7.88

Example 5

A mixture of dl-α-bromo-β-methoxy-n-butyric acids distilling at 125–128° C. was prepared by the method of Carter et al., Organic Syntheses vol. 20, page 101 (1940). This mixture was chlorinated by the same procedure as described in Example 1.

The dl-α-bromo-β-methoxy-n-butyric acid chloride was reacted with aniline in the same manner as Example 4.

A solution of 6.8 grams of this dl-α-bromo-β-methoxy-n-butyranilide in 30 cc. of methanol and 15 cc. of liquid ammonia was heated at 75° C. for 24 hours in a bomb. The solution was concentrated to dryness resulting in a residue containing dl-α-amino-β-methoxy-n-butyranilide. To this residue was added 42.5 cc. of 40% hydrogen bromide. The reaction mixture was heated at reflux temperature for 14 hours. Bioassay showed a 39% yield of DL-threonine.

For comparison a dl-α-bromo-β-methoxy-n-butyric acid mixture similar to the above starting material was aminated directly by the method of Carter et al. (Organic Syntheses 20, 101 (1940)). The amination mixture was concentrated to dryness in vacuo and hydrolyzed by refluxing for 2 hours with 40% hydrogen bromide. Bioassay showed a 30% yield of DL-threonine.

The above description and examples are intended to be illustrative only. Any modifications of, or variations therefrom, which conform to the spirit of the invention, are intended to be included within the scope of the claims.

We claim:

1. A compound having the structure of

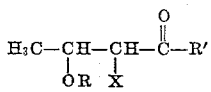

R is alkyl, X is halogen, R' is selected from the class consisting of NH₂, NH-aryl, N(alkyl)₂ and secondary N-heterocyclic groups.

2. dl-α-Bromo-β-methoxy-n-butyric acid piperidide having a melting point of 41–43° C.

3. dl-α-Bromo-β-methoxy-n-butyric acid anilide having a melting point of 106–107° C.

4. dl-α-Bromo-β-methoxy-n-butyramide having a melting point of 106–107° C.

5. dl-α-Bromo-β-methoxy-(N,N-dimethyl)-n-butyramide having a boiling point of 101–104° C./6–7 mm. pressure.

6. The process of preparing DL-threonine comprising the steps of reacting a racemate containing dl-α-halo-β-alkoxy-n-butyric acid which normally yields DL-allothreonine on amination and hydrolysis, with a halogenating agent in an organic solvent medium to form dl-α-halo-β-alkoxy-n-butyric acid halide, reacting the latter mixture with a compound selected from the group consisting of ammonia, primary and secondary amines, recovering the corresponding dl-α-halo-β-alkoxy-n-butyric acid amido compound thus formed, aminating the latter compound with a liquid selected from the group consisting of liquid ammonia and a mixture of ammonia and a lower aliphatic alcohol, concentrating the reaction mixture to dryness, hydrolyzing the residue and recovering DL-threonine.

7. The process of preparing DL-threonine comprising the steps of reacting a racemate containing dl-α-halo-β-alkoxy-n-butyric acid which normally yields DL-allothreonine on amination and hydrolysis, with thionyl halide in an organic solvent medium to form dl-α-halo-β-alkoxy-n-butyric acid halide, reacting the latter solution with piperidine, recovering α-halo-β-alkoxy-n-butyric acid piperidide, aminating the latter compound with a liquid selected from the group consisting of liquid ammonia and a mixture of ammonia and a lower aliphatic alcohol, concentrating the reaction mixture to dryness, hydrolyzing the residue and recovering DL-threonine.

8. The process of preparing DL-threonine comprising the steps of reacting a racemate containing dl-α-halo-β-alkoxy-n-butyric acid which normally yields DL-allothreonine on amination and hydrolysis, with thionyl halide in an organic solvent medium to form dl-α-halo-β-alkoxy-n-butyric acid halide, reacting the latter solution with aniline, recovering dl-α-halo-β-alkoxy-n-butyric acid anilide, aminating the latter compound with a liquid selected from the group consisting of liquid ammonia and a mixture of ammonia and a lower aliphatic alcohol, concentrating the reaction mixture to dryness, hydrolyzing the residue and recovering DL-threonine.

9. The process of preparing DL-threonine comprising the steps of reacting a racemate containing dl-α-halo-β-alkoxy-n-butyric acid which normally yields DL-allothreonine on amination and hydrolysis, with thionyl halide in an organic solvent medium to form dl-α-halo-β-alkoxy-n-butyric acid halide, reacting the latter solution with ammonia, recovering dl-α-halo-β-alkoxy-n-butyramide, aminating the latter compound with a liquid selected from the group consisting of liquid ammonia and a mixture of ammonia and a lower aliphatic alcohol, concentrating the reaction mixture to dryness, hydrolyzing the residue and recovering DL-threonine.

10. The process of preparing DL-threonine comprising the steps of reacting a racemate containing dl-α-halo-β-alkoxy-n-butyric acid which normally yields DL-allothreonine on amination and hydrolysis, with thionyl halide in an organic solvent medium to form dl-α-halo-β-alkoxy-n-butyric acid halide, reacting the latter solution with dimethylamine, recovering dl-α-halo-β-alkoxy-(N,N-dimethyl)-n-butyramide, aminating the latter compound with a liquid selected from the group consisting of liquid ammonia and a mixture of ammonia and a lower aliphatic alcohol, concentrating the reaction mixture to dryness, hydrolyzing the residue and recovering DL-threonine.

11. The process of preparing DL-threonine comprising reacting dl-α-bromo-β-methoxy-n-butyric acid having a melting point of 62–63° C. with thionyl chloride in a benzene medium to form dl-α-bromo-β-methoxy-n-butyric acid chloride reacting the latter solution with a benzene solution of piperidine, recovering dl-α-bromo-β-methoxy-n-butyric acid piperidide, aminating the latter compound with liquid ammonia, concentrating the reaction mixture to dryness, hydrolyzing the residue and recovering DL-threonine.

12. In the process of preparing DL-threonine the steps comprising aminating dl-α-bromo-β-methoxy-n-butyric acid piperidide having a melting point of 41–43° C. with a liquid, selected from the group consisting of liquid ammonia, and a mixture of ammonia and a lower aliphatic alcohol, hydrolyzing the resulting dl-α-amino-β-methoxy-n-butyric acid piperidide and isolating DL-threonine.

13. In the process of preparing DL-threonine the steps comprising aminating dl-α-bromo-β-methoxy-n-butyric acid anilide having a melting point of 106–107° C. with a liquid, selected from the group consisting of liquid ammonia, and a mixture of ammonia and a lower aliphatic alcohol, hydrolyzing the resulting dl-α-amino-β-methoxy-n-butyric acid anilide and isolating DL-threonine.

14. In the process of preparing DL-threonine the steps comprising aminating dl-α-bromo-β-methoxy-n-butyramide having a melting point of 106–107° C. with a liquid, selected from the group consisting of liquid ammonia, and a mixture of ammonia and a lower aliphatic alcohol, hydrolyzing the resulting dl-α-amino-β-methoxy-n-butyramide and isolating DL-threonine.

15. In the process of preparing DL-threonine the steps comprising aminating dl-α-bromo-β-methoxy-(N,N-dimethyl)-n-butyramide having a boiling point of 101–104° C./6–7 mm. pressure with a liquid, selected from the group consisting of liquid ammonia, and a mixture of ammonia and a lower aliphatic alcohol, hydrolyzing the resulting dl-α-amino-β-methoxy-(N,N-dimethyl)-n-butyramide and isolating DL-threonine.

16. In the process for preparing DL-threonine from dl-α-halo-β-alkoxy-n-butyric acid involving converting the α-halo- to an α-amino radical and hydrolyzing the β-alkoxy to a β-hydroxy radical, the improved procedure that comprises selecting a racemate containing dl-α-halo-β-alkoxy-n-butyric acid which normally yields DL-allothreonine on amination and hydrolysis, reacting said dl-α-halo-β-alkoxy-n-butyric acid with a halogenating agent in an organic solvent medium to form dl-α-halo-β-alkoxy-n-butyric acid halide, reacting the latter solution with a compound selected from the group consisting of ammonia, primary and secondary amines and recovering the corresponding dl-α-halo-β-alkoxy-n-butyric acid amido compound.

17. In the process for preparing DL-threonine from dl-α-halo-β-alkoxy-n-butyric acid involving converting the α-halo to an α-amino radical, and hydrolyzing the β-alkoxy to a β-hydroxy radical, the improved procedure that comprises selecting a racemate containing dl-α-halo-β-alkoxy-n-butyric acid which normally yields DL-allothreonine on amination and hydrolysis, reacting said dl-α-halo-β-alkoxy-n-butyric acid with thionyl halide in an organic solvent medium to form dl-α-halo-β-alkoxy-n-butyric acid halide, reacting the latter solution with a compound selected from the group consisting of ammonia, primary and secondary amines and recovering the corresponding dl-α-halo-β-alkoxy-n-butyric acid amido compound.

18. In the process for preparing DL-threonine from dl-α-bromo-β-methoxy-n-butyric acid involving converting the α-bromo- to an α-amino radical, and hydrolyzing the β-methoxy to a β-hydroxy radical, the improved procedure that comprises reacting dl-α-bromo-β-methoxy-n-butyric acid having a melting point of 62–63° C. with thionyl chloride in a benzene medium to form dl-α-bromo-β-methoxy-n-butyric acid chloride, reacting the latter mixture with piperidine and recovering dl-α-bromo-β-methoxy-n-butyric acid piperidide having a melting point of 41–43° C.

19. In the process for preparing DL-threonine from dl-α-bromo-β-methoxy-n-butyric acid involving converting the α-bromo to an α-amino radical, and hydrolyzing the β-methoxy to a β-hydroxy radical, the improved procedure that comprises reacting dl-α-bromo-β-methoxy-n-butyric acid having a melting point of 62–63° C. with thionyl chloride in a benzene medium to form dl-α-bromo-β-methoxy-n-butyric acid chloride, reacting the latter mixture with aniline, and recovering dl-α-bromo-β-methoxy-n-butyric acid anilide having a melting point of 106–107° C.

20. In the process for preparing DL-threonine from dl-α-bromo-β-methoxy-n-butyric acid involving converting the α-bromo- to an α-amino radical and hydrolyzing the β-methoxy to a β-hydroxy radical, the improved procedure that comprises reacting dl-α-bromo-β-methoxy-n-butyric acid having a melting point of 62–63° C. with thionyl chloride in a benzene medium to form dl-α-bromo-β-methoxy-n-butyric acid chloride reacting the latter mixture with ammonia, and recovering dl-α-bromo-β-methoxy-n-butyramide having a melting point of 106–107° C.

21. In the process for preparing DL-threonine from dl-α-bromo-β-methoxy-n-butyric acid involving converting the α-bromo to an amino radical and hydrolyzing the β-methoxy to a β-hydroxy radical, the improved procedure that comprises reacting dl-α-bromo-β-methoxy-n-butyric acid having a melting point of 62–63° C. with thionyl chloride in a benzene medium to form dl-α-bromo-β-methoxy-n-butyric acid chloride, reacting the latter mixture with dimethylamine and recovering dl-α-bromo-β-methoxy-(N,N-dimethyl)-n-butyramide having a boiling point of 101–104° C./6–7 mm. pressure.

KARL PFISTER, III.
CHARLES A. ROBINSON.
MAX TISHLER.

REFERENCES CITED

The following references are of record in the file of this patent:

UNITED STATES PATENTS

| Number | Name | Date |
|---|---|---|
| 2,446,192 | Pfister et al. | Aug. 3, 1948 |
| 2,447,361 | Peck et al. | Aug. 17, 1948 |

OTHER REFERENCES

Jacobs et al., Beilstein (Handbuch, 4th Ed., 1st Sup.), vol. 4, p. 352 (1929).

Burch, J. Chem. Soc., vol. 1930, pp. 310–312.

West et al., J. Biol. Chem., vol. 122, p. 605 (1938).

Carter et al., "Organic Syntheses," vol. 20, p. 101 (1940).

Wood et al., J. Biol. Chem., vol. 134, pp. 413–416 (1940).

Von Braun et al., Beilstein (Handbuch, 4th Ed., 2nd Sup.), vol 4, p. 783 (1942).